United States Patent [19]

Johnson et al.

[11] Patent Number: 4,990,368
[45] Date of Patent: Feb. 5, 1991

[54] PROCESS FOR FLAME RETARDING TEXTILES

[75] Inventors: James R. Johnson, McLeansville; Arvind D. Joshi, Greensboro, both of N.C.

[73] Assignee: Burlington Industries, Inc., Greensboro, N.C.

[21] Appl. No.: 365,463

[22] Filed: Jun. 13, 1989

[51] Int. Cl.$^5$ .............................................. B05D 3/02
[52] U.S. Cl. .................................... 427/190; 427/195; 427/201; 427/316; 427/376.2; 427/389.9; 427/393.3
[58] Field of Search ............ 427/190, 195, 316, 389.9, 427/393.3, 376.2

[56] References Cited

U.S. PATENT DOCUMENTS

| | | | |
|---|---|---|---|
| 4,468,495 | 8/1984 | Pearson | 525/158 |
| 4,552,803 | 11/1985 | Pearson | 428/262 |
| 4,600,606 | 7/1986 | Mischutin | 427/389 |

*Primary Examiner*—Bernard Pianalto
*Attorney, Agent, or Firm*—Nixon & Vanderhye

[57] ABSTRACT

Flame retardant properties are imparted to a textile substrate by application of a powdered flame retardant in solid form, which is then fused or melted onto the textile to durably attach the flame retardant to the textile. The process is especially adapted for water-insoluble solid flame retardants, such as hexabromocyclododecane, currently applied in dispersion or emulsion form.

19 Claims, No Drawings

PROCESS FOR FLAME RETARDING TEXTILES

This invention relates to procedures for imparting flame resistance to textiles and more particularly to flame retarding textiles by applying molten flame retardants to textile substrates.

BACKGROUND AND SUMMARY OF THE INVENTION

Many of the chemicals used to impart flame resistance to textile materials, especially to thermoplastic textile substrates, are not water soluble and thus are usually applied by padding as aqueous dispersions or emulsions. Aqueous dispersions of water-insoluble, non-phosphorus-containing brominated aromatic or cycloaliphatic organic compounds and a metal oxide together with a latex or other binder are described in U.S. Pat. No. 4,600,606. These dispersions or emulsions require high levels of dispersing agents, surfactants, and sometimes organic solvents, in order to function effectively. Even so, dispersion or emulsion stability is often very concentration dependent and sensitive to the presence of other additives in the application bath. Also, the dispersing agents, surfactants, and especially the organic solvents can cause other difficulties in the treatment process, for example color loss of a dyed substrate being finished.

There are many methods for applying flame retardants to textile fabrics. The application method used depends on the characteristics of the flame retardant being applied as well as on its interaction with the substrate. For example, flame retardants that are water soluble cannot be applied by exhaustion from aqueous baths. Also, water-soluble flame retardants which have low boiling points cannot be applied by pad/dry/cure techniques due to the high loss of material during the drying step.

Powder coating techniques have been used in the past 20 years to apply a coating powder, usually a thermoplastic, more typically a thermosetting resin, onto a solid surface such as metal objects. Fluidized-bed coating and electrostatic powder-spray coating are but two illustrations. Powder-coating processes are fusion coating processes which require the powder particles to be fused or melted at some point in the coating process. The substrate to which they are applied must be capable of withstanding the temperatures needed to fuse or melt the coating powder particles, at least for momentary periods of time and in specific, limited, usually surface areas.

Coating powders and powder-coating processes offer a number of significant advantages: they are essentially 100% nonvolatile and no solvents or other undesired substances are given off during application and curing. The powders are ready to use and require no thinning or dilution with the attendant need for organic solvents, nor do they require complex emulsion or dispersion formulation. Coating thickness, hence flame resistance, can be easily controlled and the powder is well utilized. Overspray can be collected or filtered from the surrounding atmosphere and reapplied, an important consideration when the material applied is costly.

We have developed and hereby describe procedures for applying flame retardant chemicals in powder form onto textile substrates using powder coating techniques.

DESCRIPTION OF THE INVENTION

Our invention imparts flame resistance to textile substrates using dry, powdered, undiluted flame retardants optionally with other adjuvants. The flame retardant-containing composition is a fine, free-flowing powder and it is applied by spray, dusting or other suitable techniques to the textile substrate requiring such treatment. Heat fuses or melts the flame retardant and secures it to the fibers of the textile substrate. Heat is employed following application of the powder, and also usually prior to powder application to facilitate attachment and durability of the flame resistant properties to laundering.

In another aspect, the invention includes the use of a flame retardant, by itself exhibiting insufficient fusion for proper and durable fixation to the textile substrate, admixed with a suitably fusible and attachable flame retardant which provides sufficient physical entrapment for the non-binding powder to the textile substrate. Mixtures of antimony oxide with hexabromocyclododecane, in which the hexabromocyclododecane provides sufficient physical entrapment when fused to hold the antimony oxide on the surface of the substrate, suggest themselves.

The direct application of flame retardants as powders to textiles offers a number of attractive advantages and savings as compared with conventional techniques. Unlike conventional aqueous dispersions and suspensions of flame retardants, there is a significant energy savings in applying the flame retardant as a solid since there is no water to evaporate during processing. Absence of aqueous or other non-functional components minimizes potential dyestuff bleeding, color loss or other unwanted effects. Overall costs for treatment chemicals are reduced since they are applied in their undiluted state; unused solids can easily be reclaimed and there is no process of waste disposal. The degree of flame resistance is relatively easy to control and tailor to specific needs. If flame resistance does not satisfy a predetermined value, it can be easily increased by adding additional solids to the treated substrate. The equipment required to efficiently conduct the process on a commercial scale is available. Various textile substrates can be efficiently and quickly processed with minimum handling.

For use as a powder coating, flame retardants should possess the following characteristics: low melt viscosity, which affords a smooth continuous film or a uniform coating; good adhesion to the substrate; compatibility with the textile substrate to which it is applied; minimal or no interaction with dyes, sizes or finishes that are already on the textile substrate or will later be applied to the substrate; and, of course, acceptable flame-retarding properties capable of imparting at least the minimum predetermined flame resistance to the textile substrate being flame retardant treated.

The candidate flame retardant for use in the process of this invention will have a melting point in the range of about 220° F. to about 400° F., usually from about 250° F. to about 380° F. The flame retardant will be insoluble or substantially completely insoluble in water and of a particle size and consistency suitable for application as a powder to a textile substrate using available powder coating equipment, although other coating techniques may suggest themselves. The powdered flame retardant may be used by itself or, as needed, it may be admixed with a sufficient quantity of one or more bonding agents to facilitate bonding and attachment to the textile substrate to enhance the durability of flame resistance of the treated textile, provided the bonding agent(s) does not contribute unduly to the flammability of the substrate.

The textile substrate may be powder coated at ambient temperatures and thereafter heated, such as in an oven, to achieve proper fixation. Usually the textile substrate is heated prior to application of the flame retardant composition to achieve improved fixation to the substrate. By ambient temperature, we mean temperatures that exist in the textile processing and finishing areas of a textile finishing mill which may be above or below normal room temperatures of around 70° F.

The term flame retardant composition, as used herein and in the appended claims, means the powder composition applied to the textile substrate containing as the primary active ingredient a powdered water-insoluble flame retardant capable by itself of attaching and durably fixing to a textile substrate. This composition may also include a bonding agent, such as an acrylic resin, to facilitate and enhance bonding, as described, and/or another (or second) flame retardant in powder form by itself incapable of fusing and attaching to the textile substrate yet together with the first powdered flame retardant capable of enhancing the textile substrate's flame resistance.

One suitable flame retardant meeting these criteria is hexabromocyclododecane, a bromine-containing flame retardant available from several sources, which has a melting point of about 360° F. The product is normally applied as a dispersion, dried, and heated above 360° F. to melt and to fuse the hexabromocyclododecane to the surface of the textile substrate. Fixation has been found to be excellent even after 50 consecutive hot water launderings. The dispersing agents used to prepare aqueous dispersions of the hexabromocyclododecane sometimes adversely effect dyestuffs, especially disperse dyes used for dyeing polyester. At high temperatures these dispersing agents tend to pull the dyestuffs from the dyed polyester fibers, causing some color loss. Since hexabromocyclododecane is water-insoluble and has a melting point in the range of about 360° F., it may be applied directly as a solid and heated to about 360° F. to fix to the textile substrate, thus eliminating various problems attendant to the use of hexabromocyclododecane in aqueous dispersion or emulsion.

We applied powdered hexabromocyclododecane (CD-75 Great Lakes Chemical Co.), particle size less than 2 microns, to textured polyester fabric and heated the fabric for about 90 seconds at 380° F. Fixation of the flame retardant was observed; however, improved fixation was achieved when the polyester fabric was preheated to 380° F. prior to application of the hexabromocyclododecane. Efficient utilization of the flame retardant was noted when the air impingement velocity in the heating oven where the flame retardant was applied was about 2,000 ft./min. The treated textiles so produced, the first heated after powder application and the other before powder application, were tested for durability to washing by scouring in hot detergent solution and favorable results were observed.

At add-ons in excess of 3%, hexabromocyclododecane provides good flame resistance to polyester fabrics. The add-on of bromine required depends on the construction as well as the weight of the fabric being finished.

Another flame retardant for consideration, which is chemically similar to hexabromocyclododecane, is a mixture of bromine-containing isomers (FR-792, Great Lakes Chemical Co.), a byproduct of hexabromocyclododecane production. Its lower melting point allows fusion and fixation at a temperature in the range of about 320° F. to 360° F.

A bromine-containing phosphazene (1030/190 Sandoz) also to be considered has the molecular structure:

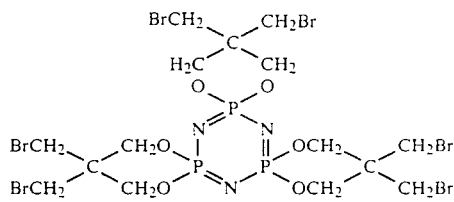

This solid flame retardant has a low melting point and is particularly suited for flame retarding cotton and polyester/cotton blends. Durability to laundering can be improved by incorporating a binder material such as an acrylic to the flame retardant powder.

The solids application flame retarding treatment of this invention is open to a range of flame retardant solids and given the explanations set out above, it will be well within the competence of the skilled person in this art, either by routine selection and experimentation or by trial and error testing, to ascertain the appropriate flame retardant material or materials to employ in flame retarding the textile substrate of concern. The following textile substrates, offered by way of illustration and not by limitation, may be considered for flame retardant treatment: polyester, nylon, cotton, polyester/cotton blends, nylon/cotton blends, wool, polyester/wool blends, aramids, particularly Nomex, either alone or blended with one or more other aramids. Carpets of diverse fiber compositions and textiles of various constructions are also appropriate for consideration.

What is claimed is:

1. A process of imparting flame resistance to a textile substrate comprising applying to a textile substrate a water-insoluble flame retardant composition containing a flame retardant capable of fusing or melting and attaching to the textile substrate at elevated temperatures, the flame retardant composition applied in powder form to the textile substrate under conditions such that the flame retardant fuses onto and durably attaches to the textile substrate and enhances the textile substrate's flame resistance.

2. The process of claim 1 in which the flame retardant composition also contains a binder to facilitate attachment of the flame retardant to the textile substrate.

3. The process of claim 1 or 2 in which the flame retardant composition also contains a second powdered flame retardant capable of imparting flame resistance to but incapable of attaching by itself to the textile substrate.

4. The process of claim 2 in which the binder is an acrylic resin.

5. The process of claim 3 in which the second flame retardant is antimony trioxide.

6. The process of claim 1 in which the flame retardant has a melting or fusion point in the range of about 225° F. to about 400° F.

7. The process of claim 6 in which the flame retardant has a melting or fusion point in the range of about 250° F. to about 380° F.

8. The process of claim 1 in which the flame retardant composition is applied to a textile substrate at ambient temperature and thereafter heated to fix the flame retardant composition onto the fabric.

9. The process of claim 1 in which the textile substrate is heated and the flame retardant composition is thereafter applied to the textile substrate.

10. A process of imparting flame resistance to a textile substrate comprising the successive steps of:
 (1) applying a powdered flame retardant composition to a textile substrate, the flame retardant composition containing a powdered, water-insoluble flame retardant capable of durably attaching and fixing onto the textile substrate at elevated temperatures and enhancing the textile substrate's flame resistance; and
 (2) heating the powder-coated textile substrate produced in step (1) to a temperature sufficient to fuse or melt the powdered flame retardant and durably fix same onto the textile substrate.

11. The process of claim 10 in which step (1) is conducted at ambient temperature.

12. The process of claim 10 in which, prior to step (1), the fabric is heated above ambient temperature prior to application of the powdered flame retardant composition in step (1).

13. The process of claim 12 in which step (2) is conducted at a temperature in the range of from about 225° F. to about 400° F.

14. The process of claim 13 in which step (2) is conducted at a temperature in the range of from about 250° F. to about 385° F.

15. The process of claim 12 in which prior to step (1), the textile substrate is heated to a temperature in the range of from about 225° F. to about 400°.

16. The process of claim 15 in which prior to step (1), the textile substrate is heated to a temperature in the range of from about 250° F. to about 385° F.

17. The process of claim 1, 6, 8, 9, 10, 11 or 12 in which the powdered flame retardant is hexabromocyclododecane.

18. The process of claim 10 in which the flame retardant composition contains (a) a binder to facilitate attachment of the flame retardant to the substrate, (b) a second powdered flame retardant capable of imparting flame resistance but incapable of attaching by itself to the textile substrate, or (c) both (a) and (b).

19. The process of claim 18 in which (a) is an acrylic binder and (b) is antimony trioxide.

* * * * *